(12) United States Patent
Ren et al.

(10) Patent No.: US 11,210,524 B2
(45) Date of Patent: Dec. 28, 2021

(54) METHOD AND APPARATUS FOR OUTPUTTING INFORMATION

(71) Applicant: Beijing Baidu Netcom Science and Technology Co., Ltd., Beijing (CN)

(72) Inventors: Kexin Ren, Beijing (CN); Xiaohan Zhang, Beijing (CN); Zhifan Feng, Beijing (CN); Yang Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 11 days.

(21) Appl. No.: 16/806,408

(22) Filed: Mar. 2, 2020

(65) Prior Publication Data

US 2021/0049365 A1 Feb. 18, 2021

(30) Foreign Application Priority Data

Aug. 12, 2019 (CN) .......................... 201910738448.6

(51) Int. Cl.
*G06K 9/00* (2006.01)
*G06K 9/62* (2006.01)

(52) U.S. Cl.
CPC ..... *G06K 9/00718* (2013.01); *G06K 9/00221* (2013.01); *G06K 9/00744* (2013.01); *G06K 9/6201* (2013.01)

(58) Field of Classification Search
CPC ........ G06N 5/027; G06N 5/022; G06N 7/005; G06K 9/00288; G06K 9/00664;
(Continued)

(56) References Cited

U.S. PATENT DOCUMENTS 8,959,079 B2 2/2015 Ronen
9,535,902 B1 * 1/2017 Michalak ................ G06F 40/30
(Continued)

FOREIGN PATENT DOCUMENTS

CN 104298676 A 1/2015
CN 104484339 A 1/2018
(Continued)

OTHER PUBLICATIONS

Using Visual Context and Region Semantics for High-Level Concept Detection (Year: 2009).*
(Continued)

*Primary Examiner* — Nizar N Sivji
(74) *Attorney, Agent, or Firm* — Nixon Peabody LLP

(57) ABSTRACT

A method and an apparatus for outputting information are provided according to embodiments of the disclosure. The method includes: recognizing a target video, to recognize at least one entity and obtain a confidence degree of each entity, the entity including a main entity and related entities; matching the at least one entity with a pre-stored knowledge base to determine at least one candidate entity; obtaining at least one main entity by expanding the related entities of the at least one candidate entity based on the knowledge base, and obtaining a confidence degree of the obtained main entity; and calculating a confidence level of the obtained main entity based on the confidence degree of each of the related entities of the at least one candidate entity and the confidence degree of the obtained main entity, and outputting the confidence level of the obtained main entity.

11 Claims, 5 Drawing Sheets

(58) Field of Classification Search
CPC ............ G06K 9/6273; G06K 9/00711; G06K 9/00335; G06K 9/00221; G06K 9/00348; G06K 9/00758; G06K 2209/27; G06K 9/00302; G06K 9/00718; G06K 9/00744; G06K 9/6201; G06F 3/017; G06F 16/735; G06F 16/9024; G06F 16/75

See application file for complete search history.

(56) References Cited

U.S. PATENT DOCUMENTS

| | | | | |
|---|---|---|---|---|
| 2012/0201472 | A1* | 8/2012 | Blanchflower | G06K 9/00671 382/224 |
| 2013/0081082 | A1* | 3/2013 | Riveiro Insua | H04N 21/8549 725/38 |
| 2013/0322765 | A1* | 12/2013 | Neumann | G10L 25/57 382/197 |
| 2013/0329970 | A1* | 12/2013 | Irie | G06K 9/00288 382/118 |
| 2017/0372505 | A1* | 12/2017 | Bhat | G06T 7/11 |
| 2018/0053364 | A1* | 2/2018 | Bhattacharya | G07C 9/00563 |
| 2018/0082314 | A1 | 3/2018 | Faith et al. | |
| 2018/0181651 | A1* | 6/2018 | Pospelova | G06F 16/313 |
| 2018/0300557 | A1* | 10/2018 | Rodenas | G11B 27/10 |
| 2019/0258671 | A1* | 8/2019 | Bou | G06K 9/00751 |

FOREIGN PATENT DOCUMENTS

| | | |
|---|---|---|
| CN | 109933688 A | 6/2019 |
| WO | 2018081751 A1 | 5/2018 |

OTHER PUBLICATIONS

Semantic Image Segmentation and Object Labeling (Year: 2007).*
Researching Persons & Organizations AWAKE: From Text to an Entity-Centric Knowledge Base (Year: 2014).*
Video Entity Resolution: Applying ER Techniques for Smart Video Surveillance (Year: 2011).*
Bu, Y. et al., "Face recognition method based on uncertainty measurement combined with 3D features extraction using active appearance model," Journal of Computer Applications, 36)7):1971-1975 (2016).

* cited by examiner

US 11,210,524 B2

METHOD AND APPARATUS FOR OUTPUTTING INFORMATION

CROSS-REFERENCE TO RELATED APPLICATIONS

This application claims priority to Chinese Patent Application No. 201910738448.6, filed on Aug. 12, 2019, titled "Method and Apparatus for Outputting Information," which is hereby incorporated by reference in its entirety.

TECHNICAL FIELD

Embodiments of the present disclosure relate to the field of computer technology, and in particular to, a method and apparatus for outputting information.

BACKGROUND

Based on the understanding of video contents, personalized recommendations for users can be realized, thereby increasing the user stickiness of the whole product. An entity is an important part in the understanding of the whole video contents, and based on the entity, other fine-grained semantic annotations such as topics can be extended.

For entity annotation, there is a plurality of calculation methods for different modals. For example, the face recognition technology recognizes a person appearing in a video, and the text extraction technology extracts an entity appearing in video text description such as a title. However, limited to the incompleteness of single-modal information, the single-modal entity annotation effects will always encounter a bottleneck (accuracy cannot reach 100%). Relying on a knowledge base, a multi-modal result for the recognition can be verified to improve the bottleneck encountered in the single-modal. For example, for a movie clip of Nirvana in Fire, a face recognition result is Wang Junkai. Based on knowledge base information, it is known that Wang Junkai does not play a relevant role in the Nirvana in Fire, thus correcting the face recognition result. However, the knowledge base information is not always correct (mistakes will always be introduced when establishing the knowledge base), and therefore the whole verifying process is uncertain (including mistakes).

SUMMARY

Embodiments of the present disclosure present a method and apparatus for outputting information.

In a first aspect, a method for outputting information is provided according to embodiments of the disclosure. The method includes: recognizing a target video, to recognize at least one entity and obtain a confidence degree of each entity, the entity comprising a main entity and related entities; matching the at least one entity with a pre-stored knowledge base to determine at least one candidate entity; obtaining at least one main entity by expanding the related entities of the at least one candidate entity based on the knowledge base, and obtaining a confidence degree of the obtained main entity; and calculating a confidence level of the obtained main entity based on the confidence degree of each of the related entities of the at least one candidate entity and the confidence degree of the obtained main entity, and outputting the confidence level of the obtained main entity.

In some embodiments, the method further comprises: determining a main entity with a highest confidence level exceeding a preset threshold, for use as a target entity; and obtaining related entities by expanding the target entity based on the knowledge base, and outputting the obtained related entities.

In some embodiments, the method further comprises: verifying the at least one entity based on a confidence degree of a side relationship of the knowledge base and the target entity.

In some embodiments, the recognizing a target video comprises at least one of following items: performing a face recognition on the target video; performing a video fingerprint recognition on the target video; or performing a text recognition on the target video.

In some embodiments, the calculating a confidence level of the obtained main entity based on the confidence degree of each of the related entities of the at least one candidate entity and the confidence degree of the obtained main entity comprises: determining the confidence level of the obtained main entity using related entity corresponding to the obtained main entity as an evidence and the obtained main entity as a conclusion, based on a confidence degree of the related entity corresponding to the obtained main entity and the confidence degree of the obtained main entity.

In some embodiments, the method further comprises: synthesizing, in response to at least one evidence supporting the obtained main entity used as the conclusion, the confidence level of the obtained main entity, to obtain a final confidence level of the obtained main entity, the at least one evidence being independent of each other, and the confidence level of the obtained main entity being obtained based on each of the related entities of the at least one candidate entity.

In a second aspect, an apparatus for outputting information is provided according to embodiments of the disclosure. The apparatus includes: a recognizing unit configured to recognize a target video, to identify at least one entity and obtain a confidence degree of each entity, the entity comprising a main entity and related entities; a matching unit configured to match the at least one entity with a pre-stored knowledge base to determine at least one candidate entity; an expanding unit configured to obtain at least one main entity by expanding the related entities of the at least one candidate entity based on the knowledge base, and obtain a confidence degree of the obtained main entity; and a calculation unit configured to calculate a confidence level of the obtained main entity based on the confidence degree of each of the related entities of the at least one candidate entity and the confidence degree of the obtained main entity, and output the confidence level of the obtained main entity.

In some embodiments, the expanding unit is further configured to: determine a main entity with a highest confidence level exceeding a preset threshold, for use as the target entity; and obtain the related entities by expanding the target entity based on the knowledge base, and output the obtained related entities.

In some embodiments, the apparatus further comprises a checking unit configured to verify the at least one entity based on a confidence degree of a side relationship of the knowledge base and the target entity.

In some embodiments, the recognizing unit is further configured to execute at least one of following operations: performing a face recognition on the target video; performing a video fingerprint recognition on the target video; or performing a text recognition on the target video.

In some embodiments, the calculation unit further configured to: determine the confidence level of the obtained main entity using a related entity corresponding to the obtained main entity as an evidence and the obtained main entity as a conclusion, based on a confidence degree of the related entity corresponding to the obtained main entity and the confidence degree of the obtained main entity.

In some embodiments, the computing unit is further configured to: synthesize, in response to at least one evidence supporting the obtained main entity used as the conclusion, the confidence level of the obtained main entity obtained to obtain a final confidence level of the obtained main entity, the at least one evidence being independent of each other, and the confidence level of the obtained main entity being obtained based on each of the related entities of the at least one candidate entity.

In a third aspect, an electronic device for outputting information is provided according to embodiments of the disclosure. The electronic device includes one or more processors; and a storage apparatus, storing one or more programs, where the one or more programs, when executed by the one or more processors, cause the one or more processors to implement the method according to any embodiment of the first aspect.

In a fourth aspect, a computer readable medium is provided according to embodiments of the disclosure. The computer readable medium stores a computer program, where the program implements, when executed by a processor, the method according to any embodiment of the first aspect.

The method and apparatus for outputting information provided by some embodiments of the present disclosure finally infer a conclusion, which is uncertain to a certain degree but is reasonable, using uncertain knowledge (knowledge graph) from an uncertain single-modal result. This uncertainty is measured using a confidence level herein. It can be simply expressed as: uncertain inference=symbol deduction+confidence level calculation.

This solution can be directly adapted for two application scenarios:

1. Entity expansion: corresponding information is expanded based on the knowledge base. For example, for a movie clip, an actor can be expanded to a role. Movie and TV plays are expanded to corresponding generic terms (e.g., an affectional film).

2. Entity verification: whether the single-modal result is correct is verified based on the knowledge base. For example, for a movie clip, a face recognition result can be corrected based on a role relationship of the knowledge base.

BRIEF DESCRIPTION OF THE DRAWINGS

After reading detailed descriptions of non-limiting with reference to the following accompanying drawings, other features, objectives and advantages of the present disclosure will become more apparent.

DETAILED DESCRIPTION OF EMBODIMENTS

The present disclosure will be further described in detail below in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be noted that some embodiments in the present disclosure and some features in the disclosure may be combined with each other on a non-conflict basis. The present disclosure will be described in detail below with reference to the accompanying drawings and in combination with the embodiments.

Figure 1:
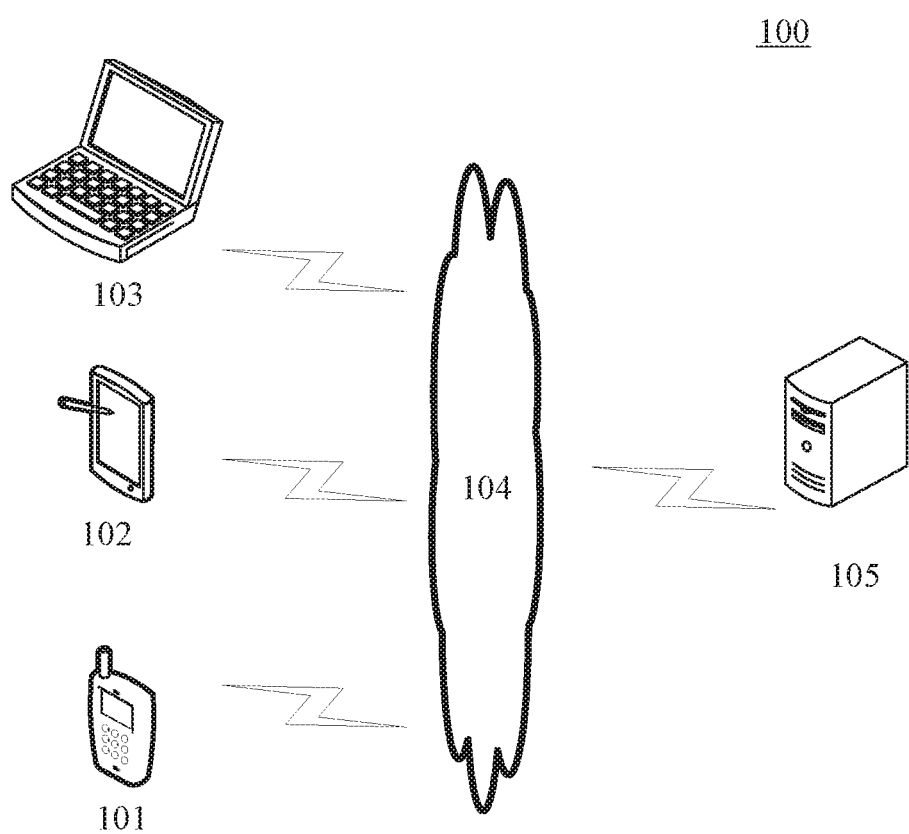
FIG. 1 is a diagram of an example system architecture in which an embodiment of the present disclosure may be implemented.

FIG. 1 shows an example system architecture 100 in which a method for outputting information or an apparatus for outputting information of an embodiment of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as a video playing application, a web browser application, a shopping application, a search application, an instant messaging tool, an email client, and social platform software.

The terminal devices 101, 102, and 103 may be hardware, or may be software. When the terminal devices 101, 102 and 103 are hardware, the terminal devices may be various electronic devices having a display screen and supporting video playing, including but not limited to a smart, phone, a tablet computer, an e-book reader, an MP3 (Moving Picture Experts Group Audio Layer III) player, an MP4 (Moving Picture Experts Group Audio Layer IV) player, a laptop portable computer, a desktop computer, and the like. When the terminal devices 101, 102, and 103 are software, the terminal devices may be installed in the above-listed electronic devices, or may be implemented as a plurality of software programs or software modules (e.g., software programs or software modules for providing distributed services), or may be implemented as a single software program or software module, which is not specifically limited here.

The server 105 may be a server providing various services, such as a back-end video server providing support for a video played on the terminal devices 101, 102, and 103. The back-end video server can process, e.g., analyze, data, such as a received recognition request, and return the processing result (e.g., a film title, and a name of an actor) to the terminal devices.

It should be noted that the server may be hardware, or may be software. When the server is hardware, the server may be implemented as a distributed server cluster composed of a plurality of servers, or may be implemented as a single server. When the server is software, the server may be implemented as a plurality of software programs or software modules (e.g., a plurality of software programs or software modules for providing distributed services), or may be implemented as a single software program or software module, which is not specifically limited here.

It should be noted that the method for outputting information provided in some embodiments of the present disclosure is generally executed by the server 105. Accordingly, the apparatus for outputting information generally provided in the server 105.

It should be understood that the numbers of terminal devices, networks, and servers in FIG. 1 are merely illustrative. Any number of terminal devices, networks, and servers may be provided based on actual requirements.

Figure 2:
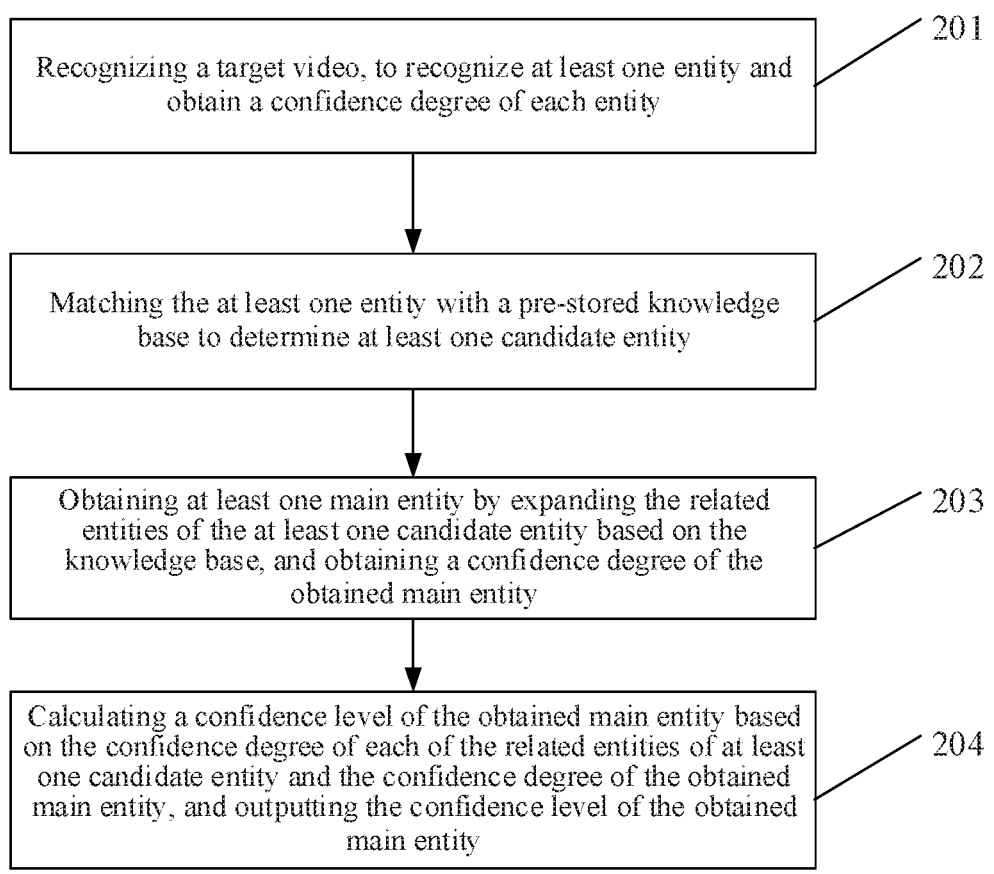
FIG. 2 is a flowchart of a method for outputting information according to an embodiment of the present disclosure.

Further referring to FIG. 2, a process 200 of a method for outputting information according to an embodiment of the present disclosure is shown. The method for outputting information includes the following steps 201 to 204.

Step 201: recognizing a target video, to recognize at least one entity and obtain a confidence degree of each entity.

In the present embodiment, an executing body (e.g., the server shown in FIG. 1) of the method for outputting information may receive a request for recognizing the target video from a user using a video playing terminal of the user through wired connection or wireless connection. The request may include the target video, or an address of the target video. The recognizing a target video includes at least one of the following items: performing a face recognition on the target video; performing a video fingerprint recognition on the target video; or performing a text, recognition on the target video. At least one entity is recognized, an entity tag is provided for each entity, and a confidence degree of each entity is obtained, where the entity includes a main entity and related entities.

Video recognition uses a conventional single-modal entity annotation method. For example, the annotation is simply based on a text or visual information of the video. The text entity annotation is mainly based on an entity linking technology, i.e., linking entities in the text with a knowledge base. At present, visual entity annotation is mainly concentrated on face recognition and general object detection in the academic circle and the industrial circle. An example of popular face recognition technologies is deepID of Facebook, and a common mainstream algorithm of general object detection yolo algorithm. Video fingerprint recognition of the target video refers to extracting a "fingerprint" from the target video, and then matching the target video with videos pre-stored in a video library, to find out a successfully matched video, a corresponding title of the matched video being a title of the target video.

Before detailing the overall solution, concepts of the main entity and the related entities are first briefly described. The main entity refers to an entity that characterizes the core of a video (for example, for a movie clip, the main entity is a movie title), and the related entities are other entities and related attributes (for example, for the movie clip, on the premise that the main entity is known, actors, roles, movie types, and the like can be obtained by expansion) that are obtained by expansion based on the main entity and the knowledge base.

Step 202: matching the at least one entity with a pre-stored knowledge base to determine at least one candidate entity.

In the present embodiment, the knowledge base may be a database such as a knowledge graph that stores corresponding relationships between entities. For example, a corresponding relationship between an animation title and an animation role is stored for an animation video, a corresponding relationship between a variety show title, a guest, and a host is stored for a variety show video, and a corresponding relationship between a game name and a game role is stored for a game video. Errors may also be introduced in the process of generating the knowledge base. Therefore, a relationship between entities, that is, a side in the knowledge graph, has a confidence degree. A single-modal tag is matched with the knowledge base to determine a candidate entity (for example, a face recognition result is Wang Junkai, which is matched with the knowledge base to give an id related to Wang Junkai).

Step 203: obtaining at least one main entity by expanding the related entities of the at least one candidate entity based on the knowledge base, and obtaining a confidence degree of the obtained main entity.

In the present embodiment, a main entity (such as a movie title) is obtained by expanding a related entity (such as a role/actor) through knowledge base search. A confidence degree of an obtained entity is a confidence degree of a relationship between entities in the knowledge base, such as a confidence degree of a side relationship from the actor to the movie title in the corresponding knowledge base.

Step 204: calculating a confidence level of the obtained main entity based on the confidence degree of each of the related entities of at least one candidate entity and the confidence degree of the obtained main entity, and outputting the confidence level of the obtained main entity.

In the present embodiment, since both a knowledge base relationship and a single-mode result are uncertain, it is necessary to calculate a confidence level of an inference result.

The credibility theory was proposed by Shortliffe in 1975. The confidence level is defined as a degree to which a thing or a phenomenon is true based on experience, and is modeled by a CF model. CF is also known as a certainty factor (also called as confidence level), and its symbol is IF E THEN H(CF(H|E)), where E is known as an evidence, and H is known as a conclusion. For example, IF headache AND running nose, THEN cold (0.7). 0.7 represents a confidence level that the inference result is cold. The confidence level of the obtained main entity is determined using a related entity corresponding to the obtained main entity as an evidence and the obtained main entity as a conclusion, based on a confidence degree of the related entity corresponding to the obtained main entity and the confidence degree of the obtained main entity.

A value range of the confidence level is [−1, 1]. The more an evidence supports H being true, the closer the confidence level is to 1, and otherwise, the closer the confidence level is to −1. When the confidence level is 0, it means that F has nothing to do with H.

Uncertainty inference of the CF model may be expressed as that when uncertain knowledge is used each time, conclusion uncertainty needs to be calculated based on evidence uncertainty and knowledge uncertainty. The updating equation is $CF(H)=CF(H|E)*\max\{0, CF(E)\}$.

When a plurality of pieces of knowledge supports a given conclusion, and on the premise that these pieces of knowledge are independent of each other, certainty degrees of the conclusion are different, and a final uncertain conclusion can be obtained through synthesis. The synthesis equation is as shown below:

$$CF(H) = \begin{cases} CF1(H) + CF2(H) - CF(1) \times CF2(H) \\ \quad \text{if } CF1(H) \geq 0 \text{ and } CF2 \geq 0 \\ CF1(H) + CF2(H) + CF(1) \times CF2(H) \\ \quad \text{if } CF1(H) < 0 \text{ and } CF2(H) < 0 \\ \dfrac{CF1(H) + CF2(H)}{1 - \min\{|CF1(H)|, |CF2(H)|\}} \\ \quad \text{if } CF1(H) \text{ and } CF2(H) \text{ have oppsite signs} \end{cases}$$

The above mathematical expression may be abstract. Here is an example to illustrate a calculation method of the confidence level.

When more than three pieces of knowledge support a given conclusion, every two of the three pieces of knowledge may be combined in a pair, and then a final CF (H) is obtained.

For example, for a video clip of Country Love, based on a face recognition and a title extraction, the following single-modal results can be obtained:

Face recognition result: Wang Junkai, Wu Yunfei; and title text extraction result: Zhao Si, Liu Neng. After basic analysis, candidate movie entities can be obtained: a love apartment, a sparrow, and so on. Now, based on the single-modal results (which can be considered as an evidence a in the credibility theory), a title and a confidence level of movie works (which may be considered as a conclusion H in the credibility theory) can be obtained by inference. The following symbolic representations can be established:

Rule1: If Wang Junkai is an actor of Country Love, then the TV play is Country Love==>CF (Country Love|Wang Junkai)=0

Rule2: If Wu Yunfei is an actor of Country Love, then the TV play is Country Love==>CF (Country Love|Wu Yunfei) =0.95

Rule3: If Zhao Si is a role of Country Love, then the TV play is Country Love==>CF (Country Love|Zhao S)=0.95

Rule4: If Liu Neng is a role of Country Love, then the TV play is Country Love==>CF (Country Love|Liu Neng)=0.95

According to an uncertainty calculation equation, a confidence level of each single-modal can be obtained, e.g., for the rule1:

CF_rule1 (Country Love)=CF (Country Love|Wang Junkai)*max{0, CF (Wang Junkai)}=0.

A final credibility score is obtained from finally calculated all single-modal results according to the synthesis equation. In practical applications, the credibility score can be used as the basis and reference for trust.

Figure 3:
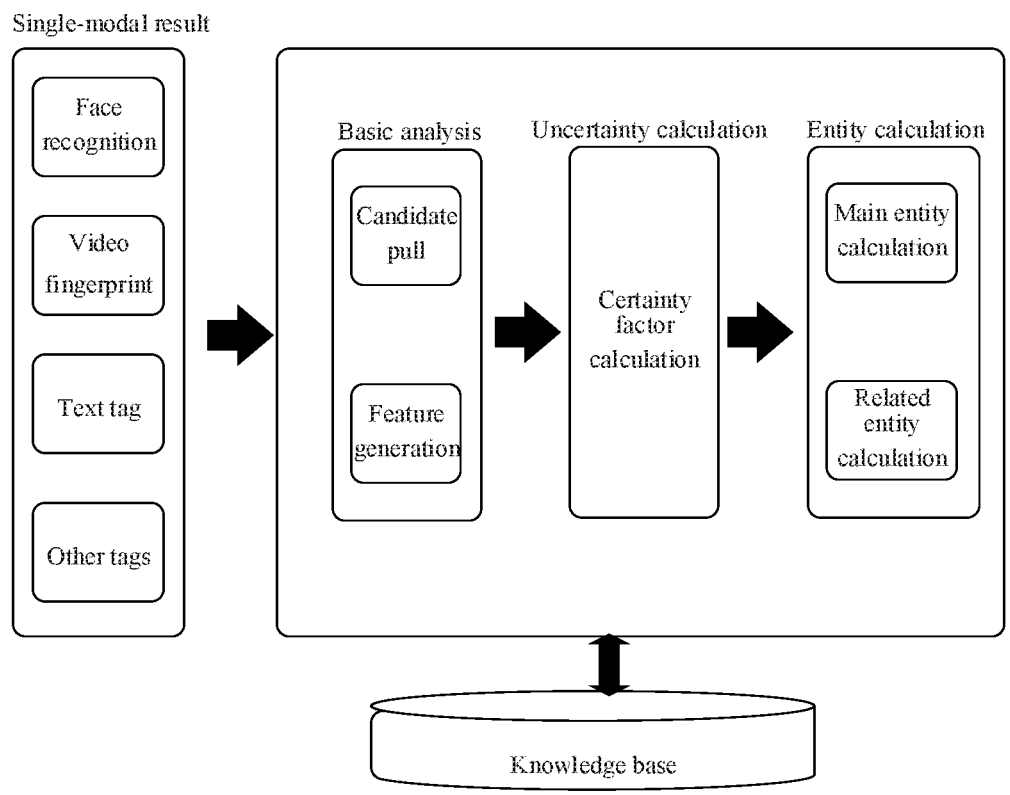
FIG. 3 is a schematic diagram of an application scenario of the method for outputting information according to the present disclosure.

Further referring to FIG. 3, FIG. 3 is a schematic diagram of an application scenario of the method for outputting information according to the present embodiment. In the application scenario of FIG. 3, after receiving a target video, a server recognizes the target video, to recognize related entities "Wang Junkai, Wu Yunfei" through face recognition, and recognize related entities "Zhao Si, Liu Neng" through text recognition. Expanding main entities such as "country love, love apartment" corresponding to related entities "Wang Junkai, Wu Yunfei," and "Zhao S Liu Neng" are searched for through a knowledge base. Confidence levels of conclusions "country love, love apartment" are calculated respectively using the related entities "Wang Junkai, Wu Yunfei," and "Zhao Si, Liu Neng" as evidences. The "country love" with a highest confidence level may be used as a title of the video.

The method provided by the above embodiments of the present disclosure can integrate single-modal entity annotation results and perform multi-modal fusion, to break through the bottleneck of the single-modal entity annotation effects, (for example, a visual annotation result can be corrected with the help of a text and the knowledge base), thereby achieving expansion based on the knowledge base, and achieving inference and expansion of fine-grained contents on the existing entity annotation results based on the knowledge base.

Figure 4:
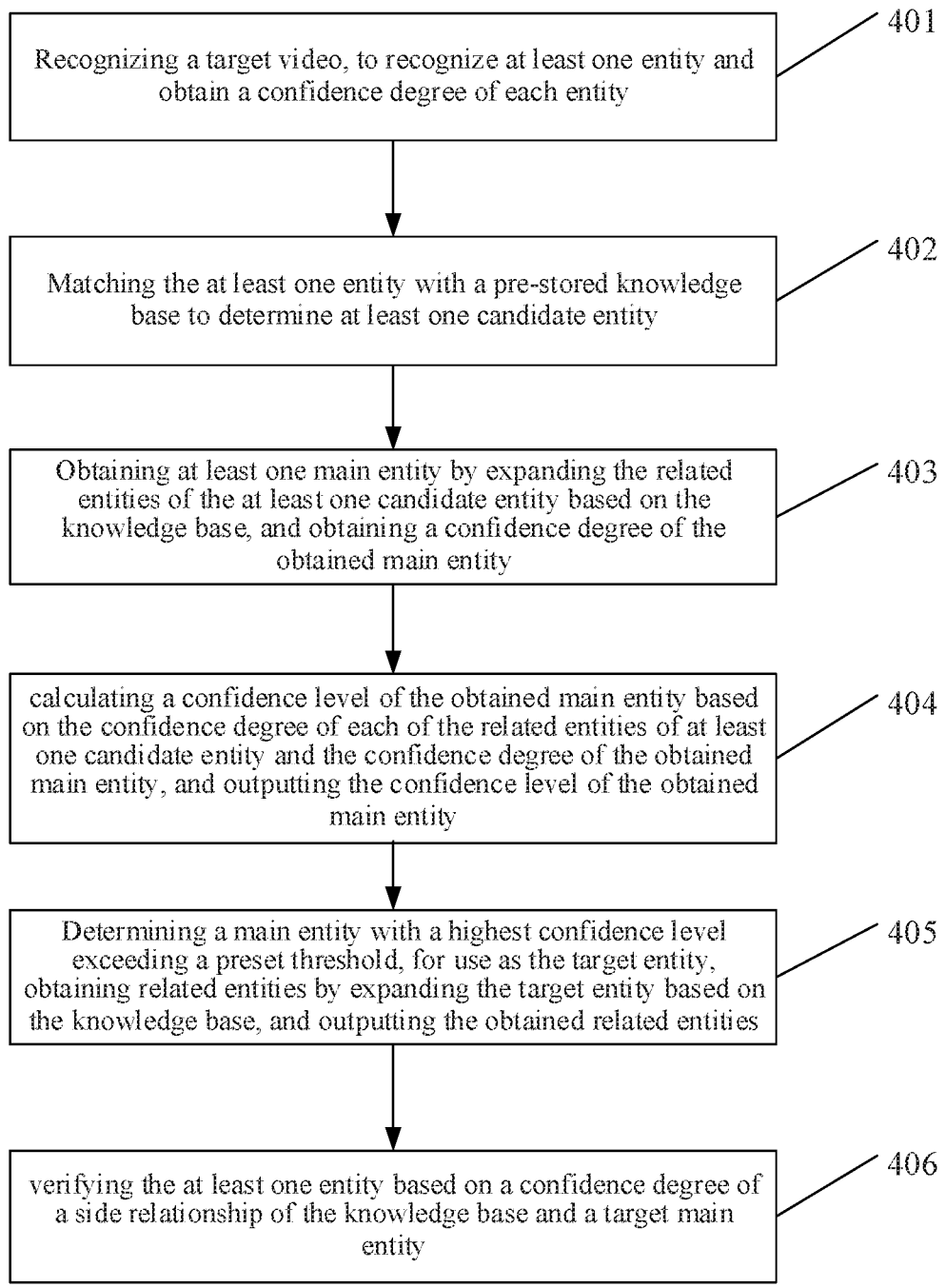
FIG. 4 is a flowchart of the method for outputting information according to another embodiment of the present disclosure.

Further referring to FIG. 4, a process 400 of another embodiment of the method for outputting information is shown. The process 400 of the method for outputting information includes the following steps 401 to 406.

Step 401: recognizing a target video, to recognize at least one entity and obtain a confidence degree of each entity.

Step 402: matching the at least one entity with a pre-stored knowledge base to determine at least one candidate entity.

Step 403: obtaining at least one main entity by expanding the related entities of the at least one candidate entity based on the knowledge base, and obtaining confidence degree of the obtained main entity.

Step 404: calculating a confidence level of the obtained main entity based on the confidence degree of each of the related entities of at least one candidate entity and the confidence degree of the obtained main entity, and outputting the confidence level of the obtained main entity.

Steps 401-404 are basically identical to steps 201-204. Therefore, the description will not be repeated.

Step 405: determining a main entity with a highest confidence level exceeding a preset threshold, for use as the target entity, obtaining related entities by expanding the target entity based on the knowledge base, and outputting the obtained related entities.

In the present embodiment, the main entity with the highest confidence level exceeding the preset threshold is determined for use as the target entity. If no main entity has the confidence level exceeding the preset threshold, then the main entity is not included in the knowledge base. The related entities are obtained by expanding the target entity based on the knowledge base. For example, from, a title of a TV play is expanded to obtain roles and actors of the TV play.

Step 406: verifying the at least one entity based on a confidence degree of a side relationship of the knowledge base and a target main entity.

In the present embodiment, a target video recognition result includes at least one entity, but there may be false detections. For example, Wang Junkai is recognized by face recognition, but the target video being "country love" is finally inferred through confidence level calculation, showing that the face recognition result is incorrect. An entity obtained from expansion in the knowledge base may also be verified.

As can be seen from FIG. 4, compared with the corresponding embodiment of FIG. 2, the process 400 of the method for outputting information in the present embodiment reflects verifying a recognized multi-modal result to improve the bottleneck encountered in the single-modal. Therefore, the solution described in the present embodiment can further improve the accuracy of video recognition.

Figure 5:
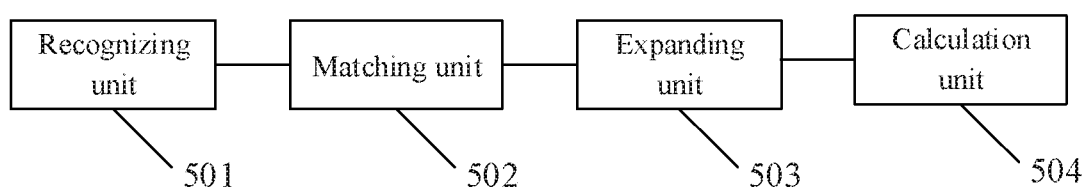
FIG. 5 is a schematic structural diagram of an apparatus for outputting information according to an embodiment of the present disclosure.

Further referring to FIG. 5, as an implementation of the method shown in the above figures, an embodiment of the present, disclosure provides an apparatus for outputting information. The embodiment of the apparatus corresponds to the embodiment of the method shown in FIG. 2. The apparatus may be specifically applied to various electronic devices.

As shown in FIG. 5, the apparatus 500 for outputting information of the present embodiment includes: a recognizing unit 501, a matching unit 502, an expanding unit 503, and a calculation unit 504. The recognizing unit 501 is configured to recognize a target video, to recognize at least one entity and obtain a confidence degree of each entity, the entity including a main entity and related entities; the matching unit 502 is configured to match the at least one entity with a pre-stored knowledge base to determine at least one candidate entity; the expanding unit 503 is configured to obtain at least one main entity by expanding the related entities of the at least one candidate entity based on the knowledge base, and obtain a confidence degree of the obtained main entity; and the calculation unit 504 is configured to calculate confidence level of the obtained main entity based on the confidence degree of each of the related entities of at least one candidate entity and the confidence degree of the obtained main entity, and output, the confidence level of the obtained main entity.

Step 201, step 202, step 203, and step 204 in the corresponding embodiment of FIG. 2 may be referred to for specific processing of the recognizing unit 501, the matching unit 502, the expanding unit 503, and the calculation unit 504 of the apparatus 500 for outputting information in the present embodiment.

In some alternative implementations of the present embodiment, the expanding unit 503 is further configured to: determine a main entity with a highest certainty factor exceeding a preset threshold, for use as the target entity; and obtain related entities by expanding the target entity based on the knowledge base, and output the obtained related entities.

In some alternative implementations of the present embodiment, the apparatus 500 further includes a verifying unit configured to: verify the at least one entity based on a confidence degree of a side relationship of the knowledge base and a target main entity.

In some alternative implementations of the present embodiment, the recognizing unit 501 is further configured to execute at least one of the following operations: performing a face recognition on the target video; performing a video fingerprint recognition on the target video; or performing a text recognition on the target video.

In some alternative implementations of the present embodiment, the calculation unit 504 is further configured to: determine the confidence level of the obtained main entity using a related entity corresponding to the obtained main entity as an evidence and the obtained main entity as a conclusion, based on a confidence degree of the related entity corresponding to the obtained main entity and the confidence degree of the obtained main entity.

In some alternative implementations of the present embodiment, the calculation unit 504 is further configured to: synthesize, in response to at least one evidence supporting the obtained main entity used as the conclusion, the confidence level of the obtained main entity, to obtain a final confidence level of the obtained main entity, the at least one evidence being independent of each other, and the confidence level of the obtained main entity being obtained based on each evidence.

Figure 6:
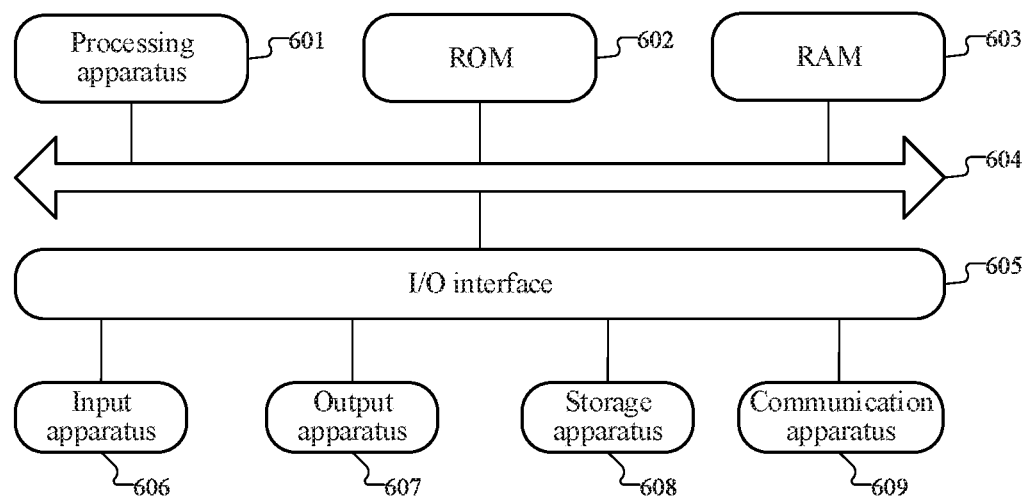
FIG. 6 is a schematic structural diagram of a computer system adapted to implement an electronic device of embodiments of the present disclosure.

Referring to FIG. 6 below, a schematic structural diagram of an electronic device (e.g., the server in FIG. 1) 600 adapted to implement embodiments of the present disclosure is shown. The server shown in FIG. 6 is merely an example, and should not impose any limitation on the functions and scope of use of some embodiments of the present disclosure.

As shown in FIG. 6, the electronic device 600 may include a processing apparatus (e.g., a central processing unit, or a graphics processor) 601, which may execute various appropriate actions and processes in accordance with a program stored in a read-only memory (ROM) 602 or a program loaded into a random access memory (RAM) 603 from a storage apparatus 608. The RAM 603 further stores various programs and data required by operations of the electronic device 600. The processing apparatus 601, the ROM 602, and the RAM 603 are connected to each other through a bus 604. An input/output (I/O) interface 605 is also connected to the bus 604.

In general, the following apparatuses may be connected to the I/O interface 605: an input apparatus 606 including a touch screen, a touch pad, a keyboard, a mouse, a camera, a microphone, an accelerometer, a gyroscope, or the like; an output apparatus 607 including a liquid crystal display device (LCD), a speaker, a vibrator, or the like; a storage apparatus 608 including a magnetic tape, a hard disk, or the like; and a communication apparatus 609. The communication apparatus 609 may allow the electronic device 600 to exchange data with other devices through wireless or wired communication. While FIG. 6 shows the 2; electronic device 600 having various apparatuses, it should be understood that it is not necessary to implement or provide all of the apparatuses shown in the figure. More or fewer apparatuses may be alternatively implemented or provided. Each block shown in FIG. 6 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is carried in a computer readable medium. The computer program includes program codes for executing the method as shown in the flow chart. In such an embodiment, the computer program may be downloaded and installed from a network via the communication apparatus 609, or be installed from the storage apparatus 608, or be installed from the ROM 602. The computer program, when executed by the processing apparatus 601, implements the above functions as defined by the method of some embodiments of the present disclosure. It should be noted that the computer readable medium of some embodiments of the present disclosure may be a computer readable signal medium or a computer readable storage medium, or any combination of the above two. For example, the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable storage medium may be any tangible medium containing or storing programs which may be used by, or used in combination with, a command execution system, apparatus or element. In some embodiments of the present disclosure, the computer readable signal medium may include a data signal in the base band or propagating as a part, of a carrier wave, in which computer readable program codes are carried. The propagating data signal may take various forms, including but not limited to an electromagnetic signal, an optical signal, or any suitable combination of the above. The computer readable signal medium may also be any computer readable medium other than the computer readable storage medium. The computer readable signal medium is capable of transmitting, propagating or transferring programs for use by, or use in combination with, a command execution system, apparatus or element. The program codes contained on the computer readable medium may be transmitted with any suitable medium, including but not limited to: wire, an optical cable, a RF (radio frequency) medium etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: recognize a target video, to recognize at least one entity and obtain a confidence degree of each entity, the entity including a main entity and related entities; match the at least one entity with a pre-stored knowledge base to determine at least one candidate entity; obtain at least one main entity by expanding the related entities of the at least one candidate entity based on the knowledge base, and obtain a confidence degree of the obtained main entity; and calculate a confidence level of the obtained main entity based on the confidence degree of each entity and the confidence degree of the obtained main entity, and output the confidence level of the obtained main entity.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including a local area network (LAN) or a wide area network (WAN), or may be connected to an external computer (for example, connected through the Internet using an Internet service provider).

The flow charts and block diagrams in the accompanying drawings illustrate architectures, functions and operations that may be implemented according to the systems, methods and computer program products of the various embodiments or the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or sometimes be executed in a reverse sequence, depending on the functions involved. It should be further noted that each block in the block diagrams and/or flow charts as well as a combination of blocks in the block diagrams and/or flow charts may be implemented by a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a recognizing unit, a matching unit, an expanding unit, and a calculation unit. The names of the units do not constitute a limitation to such units themselves in some cases. For example, the recognizing unit may be further described as a "unit configured to recognize a target video, to recognize at least one entity and obtain a confidence degree of each entity."

The above description is only a preferred embodiment of the present disclosure and an explanation of the technical principles used. It should be understood by those skilled in the art that the scope of the invention referred to in the present disclosure is not limited to the technical solution formed by the specific combination of the above technical features, but also includes other technical solutions formed by any combination of the above technical features or their equivalent features without departing from the invention concept, for example, the technical solutions form by mutually replacing the above features with (but not limited to) the technical features with similar functions disclosed in the disclosure.

What is claimed is:

1. A method for outputting information, comprising:
   recognizing a target video, to recognize at least one entity and obtain a confidence degree of each entity, the entity comprising a main entity and related entities;
   matching the at least one entity with a pre-stored knowledge base to determine at least one candidate entity;
   obtaining at least one main entity by expanding the related entities of the at least one candidate entity based on the knowledge base, and obtaining a confidence degree of the obtained main entity; and
   calculating a confidence level of the obtained main entity based on the confidence degree of each of the related entities of the at least one candidate entity and the confidence degree of the obtained main entity, and outputting the confidence level of the obtained main entity, wherein the calculating a confidence level of the obtained main entity based on the confidence degree of each of the related entities of the at least one candidate entity and the confidence degree of the obtained main entity comprises:
   determining the confidence level of the obtained main entity using a related entity corresponding to the obtained main entity as an evidence and the obtained main entity as a conclusion, based on a confidence degree of the related entity corresponding to the obtained main entity and the confidence degree of the obtained main entity.

2. The method according to claim 1, wherein the method further comprises:
   determining a main entity with a highest confidence level exceeding a preset threshold, for use as a target entity; and
   obtaining related entities by expanding the target entity based on the knowledge base, and outputting the obtained related entities.

3. The method according to claim 2, wherein the method further comprises:

verifying the at least one entity based on a confidence degree of a side relationship of the knowledge base and the target entity.

4. The method according to claim 1, wherein the recognizing a target video comprises at least one of following items:
   performing a face recognition on the target video;
   performing a video fingerprint recognition on the target video; or
   performing a text recognition on the target video.

5. The method according to claim 1, wherein the method further comprises:
   synthesizing, in response to at least one evidence supporting the obtained main entity used as the conclusion, the confidence level of the obtained main entity, to obtain a final confidence level of the obtained main entity, the at least one evidence being independent of each other, and the confidence level of the obtained main entity being obtained based on each of the related entities of the at least one candidate entity.

6. An apparatus for outputting information, comprising:
   at least one processor; and
   a memory storing instructions, wherein the instructions when executed by the at least one processor, cause the at least one processor to perform operations, the operations comprising:
   recognizing a target video, to identify at least one entity and obtain a confidence degree of each entity, the entity comprising a main entity and related entities;
   matching the at least one entity with a pre-stored knowledge base to determine at least one candidate entity;
   obtaining at least one main entity by expanding the related entities of the at least one candidate entity based on the knowledge base, and obtain a confidence degree of the obtained main entity; and
   calculating a confidence level of the obtained main entity based on the confidence degree of each of the related entities of the at least one candidate entity and the confidence degree of the obtained main entity, and output the confidence level of the obtained main entity, wherein the calculating a confidence level of the obtained main entity based on the confidence degree of each of the related entities of the at least one candidate entity and the confidence degree of the obtained main entity comprises:
   determining the confidence level of the obtained main entity using a related entity corresponding to the obtained main entity as an evidence and the obtained main entity as a conclusion, based on a confidence degree of the related entity corresponding to the obtained main entity and the confidence degree of the obtained main entity.

7. The apparatus according to claim 6, wherein the operations further comprise:
   determining a main entity with a highest confidence level exceeding a preset threshold, for use as the target entity; and
   obtaining the related entities by expanding the target entity based on the knowledge base, and output the obtained related entities.

8. The apparatus according to claim 7, wherein the operations further comprise:
   verifying the at least one entity based on a confidence degree of a side relationship of the knowledge base and the target entity.

9. The apparatus according to claim 6, wherein the recognizing a target video comprises at least one of following items:
   performing a face recognition on the target video;
   performing a video fingerprint recognition on the target video; or
   performing a text recognition on the target video.

10. The apparatus according to claim 6, wherein the operations further comprise:
    synthesizing, in response to at least one evidence supporting the obtained main entity used as the conclusion, the confidence level of the obtained main entity obtained to obtain a final confidence level of the obtained main entity, the at least one evidence being independent of each other, and the confidence level of the obtained main entity being obtained based on each of the related entities of the at least one candidate entity.

11. A non-transitory computer readable medium, storing a computer program, wherein the program, when executed by a processor, causes the processor to perform operations, the operations comprising:
    recognizing a target video, to recognize at least one entity and obtain a confidence degree of each entity, the entity comprising a main entity and related entities;
    matching the at least one entity with a pre-stored knowledge base to determine at least one candidate entity;
    obtaining at least one main entity by expanding the related entities of the at least one candidate entity based on the knowledge base, and obtaining a confidence degree of the obtained main entity; and
    calculating a confidence level of the obtained main entity based on the confidence degree of each of the related entities of the at least one candidate entity and the confidence degree of the obtained main entity, and outputting the confidence level of the obtained main entity, wherein the calculating a confidence level of the obtained main entity based on the confidence degree of each of the related entities of the at least one candidate entity and the confidence degree of the obtained main entity comprises:
    determining the confidence level of the obtained main entity using a related entity corresponding to the obtained main entity as an evidence and the obtained main entity as a conclusion, based on a confidence degree of the related entity corresponding to the obtained main entity and the confidence degree of the obtained main entity.

* * * * *